April 24, 1962    N. KRAG    3,031,109
AUTOMATIC FEEDING APPARATUS
Filed Aug. 17, 1959    2 Sheets-Sheet 1
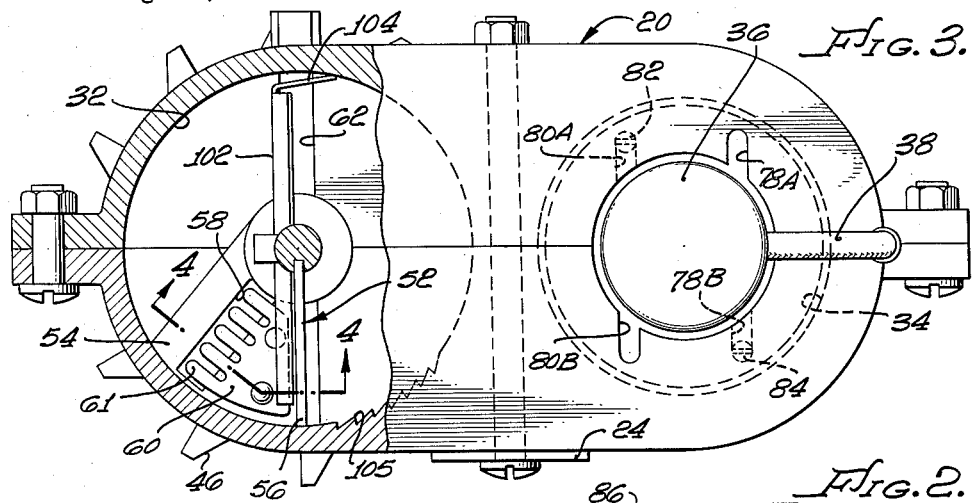
Fig. 3.
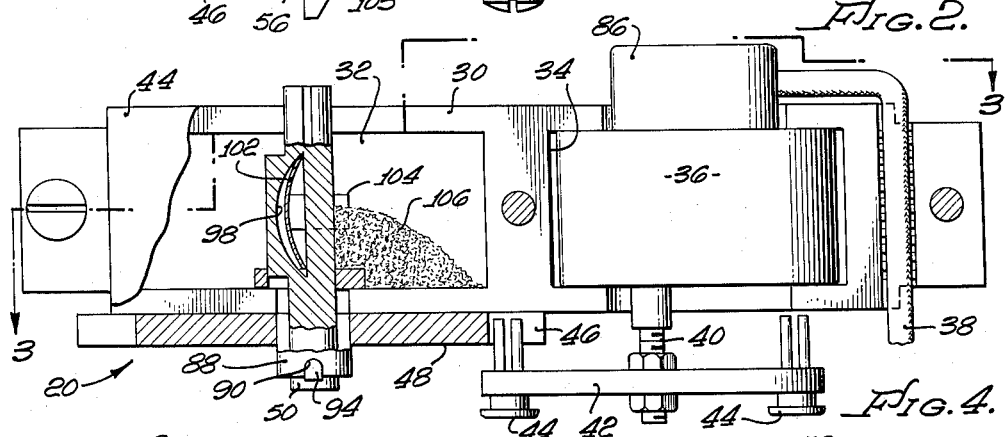
Fig. 2.
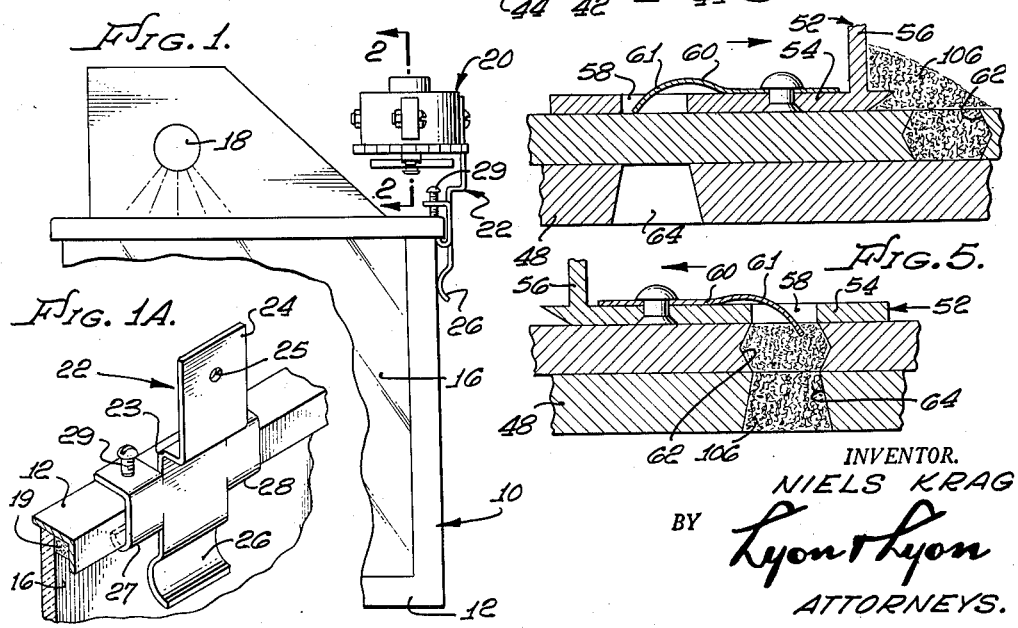
Fig. 1.
Fig. 1A.
Fig. 4.
Fig. 5.
INVENTOR.
NIELS KRAG
BY Lyon & Lyon
ATTORNEYS.

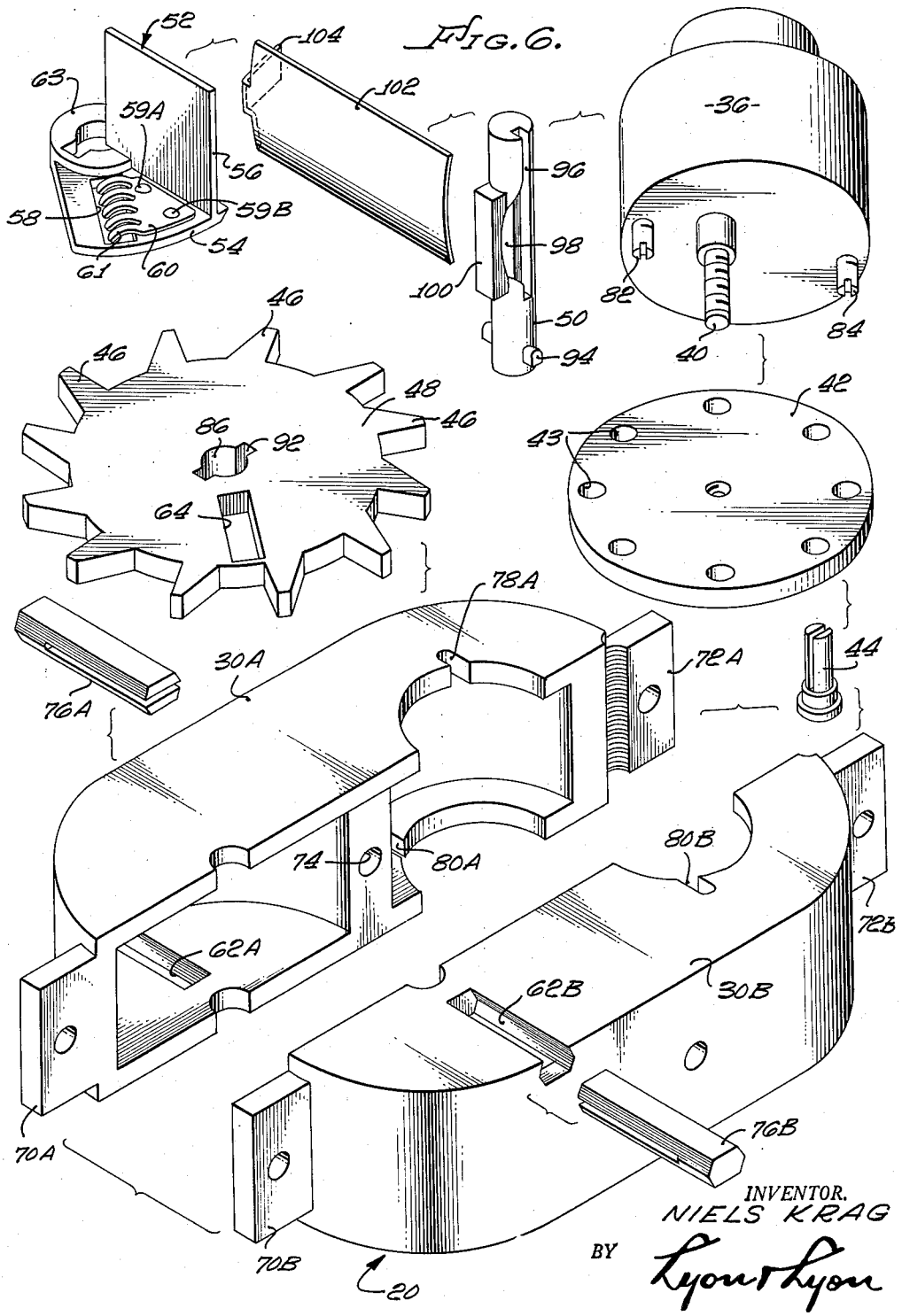

United States Patent Office 3,031,109
Patented Apr. 24, 1962

3,031,109
AUTOMATIC FEEDING APPARATUS
Niels Krag, Los Angeles, Calif., assignor, by mesne assignments, to David L. Loew, Jr., Beverly Hills, Calif.
Filed Aug. 17, 1959, Ser. No. 834,180
5 Claims. (Cl. 222—252)

This invention relates to apparatus for automatically dispensing food in desired amounts and at predetermined intervals and, more particularly, to an improved aquarium feeder.

The hobby of raising tropical fish has become quite popular. Furthermore, a well-kept aquarium has been found to be quite decorative, with the result that a great number of commercial establishments use aquariums as part of their decor. In maintaining an aquarium, the fish therein must be fed. It has been found that the health of the fish is best preserved when they are fed at the same regular intervals. Furthermore, the amount of food must be just enough for the number of fish in the tank. Too much food results in loss of fish through overeating. Too little food results in loss of fish through either starvation or cannibalism. Thus, it should be appreciated that the feeding of the fish in an aquarium is not a casual job to be done at any odd time. Furthermore, since most of the fish foods are sold in granulated form in cans, it is rather difficult to measure out the same amount of food for each feeding.

An object of the present invention is to provide a novel, automatic aquarium feed apparatus.

Another object of the present invention is to provide an aquarium feed apparatus for providing regular feeding of the same amounts of feed.

Still another object of the present invention is the provision of an automatic aquarium feed apparatus which prevents caking of dried fish food.

Yet another object of the invention is to provide an improved and reliable aquarium feed apparatus.

These and other objects of the invention are achieved by apparatus including a housing which defines two chambers. In one of these an electric motor is supported. In the other chamber, the food to be fed is placed. Inside the food chamber there is an L-shaped member which is supported in a vertical plane for rotation about an axis which is substantially at the center of the chamber. The L-shaped member is rotated about the axis by the motor and serves to push the food into an adjustable opening in the floor of the chamber. This opening has its bottom closed until the desired feeding time arrives. Only the food which has been loaded into the adjustable opening is permitted to fall into the aquarium tank. A spring member insures that the food in the adjustable member does not stick, but is ejected. The adjustable opening is thereafter closed at its bottom end to enable its being filled again by the food pushed therein by the moving L-shaped member.

The novel features that are considered characteristic of this invention are set forth with particularity in the appended claims. The invention itself, both as to its organization and method of operation, as well as additional objects and advantages thereof, will best be understood from following description when read in connection with the accompanying drawings, in which is:

FIGURE 1 is a side view of an aquarium showing an embodiment of the invention mounted in operating position;

FIGURE 1A is an isometric view showing details of a novel mounting device for mounting the embodiment of the invention;

FIG. 2 is a section taken along the lines 2—2 of the invention shown in FIGURE 1;

FIGURE 3 is a partial plan and section view of the invention taken along the lines 3—3 in FIGURE 2;

FIGURES 4 and 5 are partial sections along the lines 4—4 in FIGURE 3 which show the operation of the food-ejection member; and FIGURE 6 is an exploded view in perspective of the embodiment of the invention.

Reference is now made to FIGURE 1, which is a side view of an aquarium tank with the embodiment of the invention mounted in position. The tank 10, as is well known, usually comprises a frame 12, made of metal, with the spaces within the metal frame being filled with glass 16, to enable the fish to be observed by the spectator. Usually, a light 18 is mounted on the top of the tank. The embodiment of the invention 20, comprising an automatic fish-food feeder, is mounted on the rear of the tank. Such mounting may be achieved by the use of any suitable type of clamping device 22, which is attached to the metal edge of the frame.

A preferred novel clamping device is shown in FIGURE 1A. This includes a flat central member 23 with an offset upward-extending flange 24 having a hole 25 through which a bolt may be passed for attachment to and support of the feeder over the tank. A stabilizing member 26 extends downward from the central member 23. Extending from either side of the central member 23 are U-shaped clamped members 27, 28. The lower portion of the clamp members is curved as hooks to fit under the metal frame 12 and to extend into the sealing compound 19 between the frame 12 and glass 16. The top of each of the clamp members fits over the top of the metal frame and has a threaded hole therein. A bolt 29 in each of the clamp-member threaded holes is tightened to pull up the hooks and to bring the stabilizer 26 properly against the glass 16, whereby the automatic feeder is securely and properly supported.

Referring now to FIGURE 2, there is shown a cross section of an embodiment of the invention taken along the lines 2—2 in FIGURE 1. This includes a casing 30 which has therein two chambers 32, 34. One of these 32 is a food chamber, and the other 34 contains an electrical motor 36, which receives power over a cord 38. The motor drives a threaded shaft 40, upon which is mounted a drive disk 42. This drive disk is shown in perspective in FIGURE 6. It contains a number of apertures into which there can be inserted one or more slotted pins 44. These pins are of a size to provide a press fit into the apertures, whereby they will stay in the aperture unless they are forced out. The apertures are spaced about the disk to enable adjustment of the feed cycle, to provide a feeding interval, as desired. The drive pins 44 are rotated by the disk 42 until they engage with the teeth 46 (FIGURE 6) of a gear 48. A drive pin which is moved by the disk 42 will follow a circular path in the course of which it will engage the teeth of the gear. The gear is moved through a short arc by the pin until the pin is moved through a sufficient arc to be disengaged from the gear teeth.

The gear 48 is supported by a shaft 50 in a manner to be more clearly described subsequently. The gear rotates the shaft from which it is supported. The gear is supported on the bottom side of the housing 30 underneath the food chamber 32.

The shaft 50 extends through the food chamber 32 and is supported by the housing 30. As previously indicated, the shaft 50 is rotated by the gear 48. As may be better seen in the plan view in FIGURE 4 and the perspective view in FIGURE 6, supported on the shaft and rotated therewith is an L-shaped member 52 which includes a horizontal part 54, which is supported to be parallel with and close to the floor of the food chamber 32, and a vertical part 56, which is at right angles thereto. The junction of the horizontal and vertical parts of the L-shaped member 52 has an upward chamfer so that as the member is rotated by the shaft with the junction portion leading, the member will not dig into the floor of the cavity, but will ride up and assist the vertical portion of the member 52 in pushing any food in the chamber. Thus, the vertical part of the L-shaped member 52 serves to act as a bulldozer blade, pushing any dried food in front of it as it is moved along.

As may be seen in the sectional view in FIGURE 4, the horizontal part 54 of the member 52 has a slot 58 therein. It also carries a kickout spring 60, with teeth 61. The spring 60 is fastened to the horizontal part 54, so that the spring teeth 61 extend through the slot against the floor of the food chamber 32. Another slot 62 is formed in the base of the food chamber. Still a third slot 64 is formed within the gear 48. It should be noted that the feed chamber 32 is cylindrical and that the slot 62 exists only on one side of the center of the cylindrical cavity. Further, the slot 64 in the gear also exists only on one side of the axis. Thus, the slots will line up to provide a through opening into the food chamber at only one position of the gear, shaft, and L-shaped member. This is reached only once during a revolution of the gear. Just before the openings are aligned, as shown in section in FIGURE 4, the vertical part 56 of the member 52 pushes food into the opening 62 and causes it to be filled with the dried food. As the shaft continues to be rotated, as shown in section in FIGURE 5, the openings are aligned, whereby the food can fall through the openings into the fish tank. The spring kicker 60, 61 is moved in position as the apertures line up, so that it will spring downward to clear, or eject, the food in the opening 62. It should be noted that once the cavity is filled, no more food is entered therein by reason of the size of the horizontal member 54, which overlaps the cavity on both sides during the time that the cavity 62 is emptied.

Reference is now made to FIGURE 6, which is an exploded view in perspective of the embodiment of the invention. It will be seen that the housing 30 consists of two parts 30A and 30B. These parts are identical, but when they are brought together, one part is inverted with respect to the other. The two parts of the housing 30A and 30B are held together by means of nuts and bolts, not shown, which pass through holes in the flanges 70A, 70B, 72A, 72B, and center 74, which are made in the ears, which are part of the housing.

The opening 62A in one-half of the housing 30A is in the lower portion of the food chamber. In the inverted half 30B of the housing 30A, a corresponding opening 62B is in the upper portion of the food chamber. The opening 62B in the upper portion serves as a port through which food can be inserted into the cavity for subsequent automatic feeding. In order to close the openings 62A, 62B, there are provided respective plugs 76A, 76B. These are slightly oversize, and, by virtue of the slots therein, can be forced, without too much pressure, into the openings to remain therein. The filler plug 76A serves the function of regulating the size of the aperture 62A on the bottom of the housing, which, of course, determines the amount of food which will be fed to the fishes at any one feeding. The side of the housing which contains the motor cavity will have slots 78A, 80A, 78B, 80B, which enable the motor 36 to be held stationary within the cavity, despite the back force which arises when the drive disk 42 turns the gear 46. Motor screws 82, 84 (see FIGURE 3) fill these slots and bear against the walls of the housing, to prevent the motor from turning. The outside of the motor chamber 34 contains a ridged section 86. This serves the function of holding the power cord 38 clamped, whereby it serves as a stress relief upon the cord when the cavity is closed upon the motor.

The disk 42 contains the holes 43, into which the pins 44 may be inserted. As was described previously, these holes are positioned so that the pins, which are inserted therein, will be carried into and out of engagement with the gear 48. The speed of rotation of the gear is determined by the number of pins which are inserted into these holes.

The gear 48 has the aperture 64 therethrough on one side of its center. As previously described, this aperture 64 is the portion of the feed aperture which extends through the gear. At the center of the gear, there is a shaft opening 86, which extends through the gear. The shaft opening extends from the portion of the gear which is adjacent the bottom of the housing through the gear and through a hub 88 (shown in FIGURE 2), which is part of the gear on the side furthest away from the bottom of the housing. This hub has a keyway slot 90, which is at right angles to the slot 92 (FIGURE 6) on the opposite side of the gear. Thus, the shaft 50 has a cross pin 94 mounted at one end. The shaft can be inserted into the shaft opening 86 and through the gear and then given a right-angle turn and pulled back, whereby the cross pin 94 can engage the keyway slot 90 in the hub. It should thus be apparent how rotation of the gear 48 serves to rotate the shaft 50 therewith.

The shaft 50 carries the L-shaped member 52, which includes the vertical part 56 and the horizontal part 54. The spring-kicking member 60 is attached to the horizontal part in any well-known manner, such as by the two rivets 59A, 59B. The L-shaped member also has a hub portion 63 with a central aperture shaped to enable the shaft and its key 100 to pass therethrough.

The shaft 50 has a vertical slot 96, which does not extend completely through the whole length of the shaft, but only along a portion thereof. This slot accommodates the vertical part 56 of the L-shaped member and provides stability therefor. The vertical slot 96 has a somewhat cylindrical-shaped portion 98, which is on the order of the shape of a half-moon. In order to restore rigidity to the portion of the shaft in which the half-moon slot is made, a reinforcing key 100 is part of the shaft. This also engages the slot in the hub 63 of the L-shaped portion 52. A beryllium copper spring 102 is inserted through the slot 98 along with a portion of the vertical part 56 of the L-shaped member 52. It will be noted that the spring has a rectangular shape with a bent tail portion 104 and is bowed, in order to pass through the half-moon opening. The bowed beryllium spring exerts a force, both on the horizontal part 54, pushing downward, and also on the shaft 50, pushing upward, in attempting to straighten itself out. As may be seen in FIGURE 4, the spring also holds the L-shaped member in proper operating position. The shaft is held by operation of the spring 102 in position with the pin 94 engaging the keyway slot 90. Also, as a result of the action of the beryllium copper spring 102, when the entire assembly is mounted, the gear is pushed up against the bottom of the housing by reason of the pull-up by the pin 94 engaging the bottom of the gear. The shaft, as a result, with the L-shaped member is rotated as the gear is rotated. The horizontal part 54 is forced downward against the floor of the cavity with the result that it literally sweeps any food on the floor of the cavity in front of the vertical member 56.

The bent tail portion 104 of the spring will engage ratchet teeth 105, formed in part of the wall inside the cavity 32, for the purpose of preventing the gear 48 from being rotated clockwise, or in a backward, direction. The reason this is necessary is if, for example, this were done manually, the spring 60 and its teeth 61 could be broken when it entered the aperture 62. Therefore, the ratchet teeth only cover a small part of the cavity, as this safety precaution only is needed when the spring 60 is over the aperture 62.

The operation of the invention is extremely simple. The user simply inserts through the aperture 62B the food which it is desired to be fed. He then fixes the quantity of food that he desires fed at any one feeding by the extent to which he inserts the plug 76A into the aperture 62A. In addition, he can fix the number of times this quantity of food to be fed to the fish by the number of pins 44 that are inserted into the disk 42. It is well known that the region immediately above the fish tank is quite humid, with the result that the fish food has a tendency to cake when exposed to this humidity. Of course, the cavity within which the food is stored is made as tight as possible, in order to minimize the amount of moisture which can get in there. However, some moisture will get in. It is one of the features of this invention, however, that this moisture cannot cause the fish food to cake to the extent where it will deteriorate the operation of the system. This arises by virtue of the fact that the constant rotation of the member 52, which continuously churns the food 106, so that any tendency on the part of the food to cake is prevented. Further, any food that lodges in the aperture 62 as a result of the rotation of the shaft, assuming it does cake before it is ejected, will not block the aperture 62, in view of the action of the kickout spring 60. Thus, the prior-art defect in automatic fish feeders is obviated by the operation of this invention.

There has accordingly been described herein a novel, simple, and effective arrangement for automatically feeding food to tropical fish, for example, or other forms of life wherein it is desired to feed predescribed amounts of food at predescribed intervals.

I claim:
1. An automatic feeding apparatus comprising a housing having walls defining a chamber wherein food for automatic feeding is deposited, an adjustable opening in the floor of said chamber, a flat gear having an opening therethrough for co-operating with the opening in said chamber floor, a shaft extending through the floor of said chamber, said shaft having a slot axially disposed therein, means for coupling said flat gear to said shaft to be rotatable therewith and to be in sliding contact with the outside of said chamber floor for closing said adjustable opening except when said gear is rotated to align its opening with said adjustable opening, a movable member within said chamber for moving food into said chamber adjustable opening, said movable member being L-shaped and having a hub through which said shaft passes, said movable member being positioned relative to said shaft with the vertical part of the L adjacent said slot, means for coupling said movable member to said shaft to be rotatable therewith, means for yieldably biasing said shaft and said L-shaped member oppositely to push said movable member toward said chamber floor, said means for yieldably biasing including a bowed piece of spring metal which extends through the slot in said shaft on both sides of said shaft and exerts pressure oppositely against said hub and against said shaft at the end of said slot, and means for rotatably driving said gear at a desired speed.

2. An automatic feeding apparatus comprising a housing have walls defining a first chamber wherein food for automatic feeding is deposited, and a second chamber adjacent said first chamber, motor means within said second chamber, a drive shaft extending from said motor means external to said second chamber, a disk attached to said shaft for rotation thereby, a plurality of circularly disposed apertures in said disk, a plurality of pin for insertion into selected ones of said apertures, a gear, means extending from said first chamber for rotatably supporting said gear in sliding contact with said housing and to afford rotatable driving contact over a limited arc with the ones of said pins which are inserted in said apertures, an adjustable opening through the wall of said housing adjacent said gear and defining said first chamber, an opening through said gear positioned for alignment with said adjustable opening once for every cycle of rotation of said gear, movable means within said first chamber for pushing food into said adjustable opening, said movable means being an L-shaped member with the horizontal part of the L in sliding contact with the wall of said first chamber containing said adjustable opening and having a slotted opening therein, means coupling said movable means for actuation to said means for rotatably supporting said gear, and means for ejecting food from said adjustable opening when said gear opening is aligned therewith, said means for ejecting food form said adjustable opening including a spring attached to the horizontal part of the L-shaped member and having a toothed portion extending through the slot in the horizontal part of the L-shaped member and being yieldably biased against the wall of said first chamber to be extendable into said adjutsable opening.

3. An automatic feeding apparatus comprising a housing having walls defining a first chamber wherein food for automatic feeding is deposited, and a second chamber adjacent said first chamber, motor means within said second chamber, a drive shaft extending from said motor means external to said second chamber, a disk attached to said shaft for rotation thereby, a plurality of circularly disposed apertures in said disk, a plurality of pins for insertion into selected ones of said apertures, an adjustable opening through the wall of said first chamber extending radially from the center of said chamber, a rotatable shaft extending centrally from within said chamber through the wall having said adjustable opening, a flat gear coupled to said shaft to be rotatable therewith, said gear and disk being relatively positioned to afford rotatable driving contact with the ones of said pins which are inserted in said apertures, a radial opening through said gear positioned for alignment with said adjustable opening once for every cycle of rotation of said gear, means for filling said adjustable opening with food including an L-shaped member within said first chamber, means for coupling said L-shaped member to said shaft to be rotated therewith, said L-shaped member being coupled to said shaft to have its horizontal part in sliding contact with the wall of said chamber having said adjustable aperture, a slot in said horizontal part of said L-shaped member positioned to be aligned with said adjustable opening when said gear opening is aligned therewith, and means for clearing said adjustable opening of food including spring means attached to said horizontal part of said L-shaped section and having a toothed portion extending through said slot and biased against the chamber wall whereby it will clear said adjustable opening of food when said slot is aligned therewith.

4. An automatic feeding apparatus as recited in claim 3 wherein said housing is made of two symmetrical halves.

5. An automatic feeding apparatus as recited in claim 3 wherein said means for coupling said L-shaped member to said shaft to be rotatable therewith includes a collar attached to the horizontal part of said L-shaped member through which said shaft passes, a slot in said shaft extending substantially along the axis thereof, and a bowed spring extending through said shaft slot and on both sides thereof, said bowed spring backing the vertical part of said L-shaped member and pushing said L-shaped member until it is in sliding contact with the chamber wall and pushing in an opposite direction on said shaft until said gear is in sliding contact with the outside of said chamber wall.

References Cited in the file of this patent
UNITED STATES PATENTS

| | | |
|---|---|---|
| 1,746,590 | Hazle | Feb. 11, 1930 |
| 2,366,379 | Bemis | Jan. 2, 1945 |
| 2,706,068 | Ward | Apr. 12, 1955 |
| 2,628,807 | Lincoln | Feb. 17, 1953 |
| 2,647,716 | Hudziak et al. | Aug. 4, 1953 |
| 2,705,092 | Woodruff | Mar. 29, 1955 |